April 10, 1928.

P. J. M. ESCOLE 1,665,776

SMOOTHING AND POLISHING GLASS OR THE LIKE

Filed March 19, 1924   2 Sheets-Sheet 1

Witnesses:

Inventor:
Paul Joseph Maximilien Escole

Patented Apr. 10, 1928.

1,665,776

UNITED STATES PATENT OFFICE.

PAUL JOSEPH MAXIMILIEN ESCOLE, OF JEUMONT, FRANCE.

SMOOTHING AND POLISHING GLASS OR THE LIKE.

Application filed March 19, 1924, Serial No. 700,361, and in France June 23, 1923.

In apparatus used for smoothing and polishing glass, the glass has been laid on a rectangular table, and reciprocating rubbing devices, which sometimes have a rotary movement and which are suitably supplied with abrasive material, have been caused to engage with the glass and smooth and polish it, the table having a motion at right angles to the reciprocating motion, so that the whole surface of the glass was treated in a uniform manner.

Such apparatus has a fairly limited output and as it is very expensive in the upkeep, rotary apparatus was subsequently introduced, with which the glass was smoothed and polished by fixing the plates of rough glass on circular tables which rotated under one, two or more movable discs, whilst the abrasive material was supplied to the surface of the glass. The circular table was covered as far as possible with rectangular glass plates of commercial dimensions, and it was necessary to fill the spaces between the plates with bits of glass which were too small to be used in commerce, but which served to form a continuous surface on which the movable discs could rub.

As the operation of smoothing glass demands the successive use: (1) of sand of various degrees of fineness; (2) of emery powders of different grades, these abrasive materials were utilized successively in the same apparatus and the glass was washed in the intervals of the grinding operation. When the operation of smoothing the glass was finished, the table was removed and brought under a second apparatus which gave the glass the final finish.

After this last operation, the table was removed, the glass plates were turned over and replaced on the table and the operations were repeated.

To obviate the drawbacks of circular tables, there is at present a tendency to return to the use of rectangular tables, but with the improvement that the tables are removable; that is to say, they can be joined together or arranged in line one behind another. This idea has already been carried out in certain polishing benches where one table was working, and a second one was used for laying on or cementing the glass to it.

This arrangement, though free from the drawback of having a circular table, has nevertheless the drawback of being limited in length at its two ends, and of being capable of receiving only a certain number of glasses of given dimensions, and of having to be completed with glasses of small dimensions which are frequently useless. If in order to reduce the drawback in question, it were desired to cement a glass resting simultaneously on two consecutive tables, the transport and the manipulation of the tables would become impossible, and it would be necessary to arrange a large number of them one after another, on guides provided for the purpose, because the operation of cementing a glass to the table requires a certain amount of time, in order to allow the plaster time to set, and a table which has just been cemented cannot be used at once for working.

The present invention eliminates all the drawbacks indicated in the three systems described in the foregoing. It consists in using fixed tables, of a variable number, of the greatest possible length, and in causing the apparatus intended for polishing the glass to travel above the said fixed tables.

This new system enures a better and more rapid working, avoids loss of time at the beginning and at the end of the work, the tables being of much greater length than those used at present. It also ensures better utilization and better work of the hands who are called upon to do always the same work and become specialized in it. It ensures continuity of work which cannot be obtained with the existing or previous systems. It avoids the necessity of moving the tables, so that the installation is simplified. It facilitates the turning over of the glass either on one and the same table, or on to the adjoining tables.

The sections of the apparatus being independent of each other, the work can be subdivided or varied, according to the results desired.

An embodiment of the invention is illustrated, in a somewhat diagrammatic manner, in the accompanying drawings, in which.

In the construction shown, a table secured to the ground on foundations, with a well planed surface of a length of for instance 60 meters or more, and of any desired width approximating to that of the greatest widths of glass used, receives the glass which is laid thereon and cemented or otherwise secured to it with plaster or by suction devices, or wooden or other pines or the like.

Two rails secured to the ground and arranged each at one side of the table, support traveling carriages to which is connected a truck which receives the smoothing or polishing disc or discs hereinafter described. The said truck is driven by an electric motor, and its speed can be regulated by controllers, resistances etc. and of any desired mechanical devices so as to obtain the advance required in practice for the working of the glass.

Figure 1:
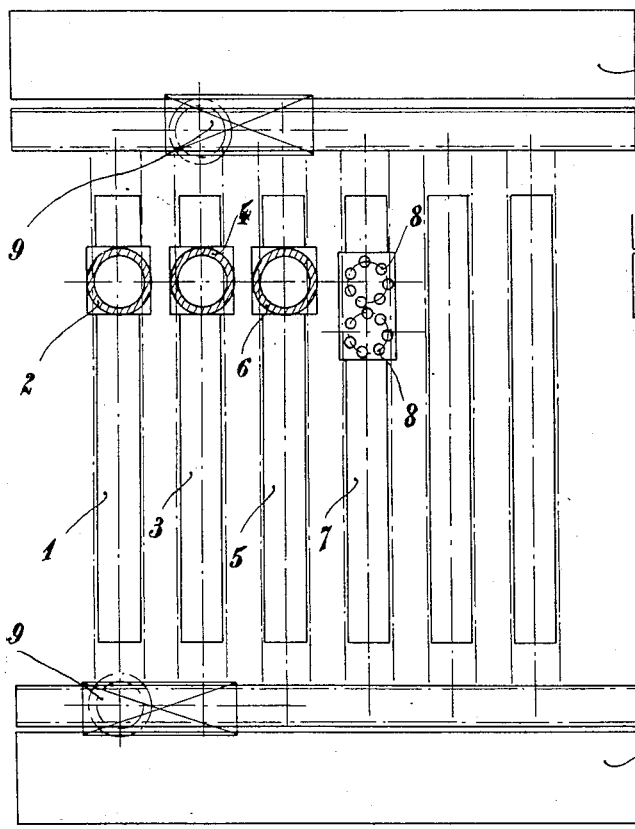
Figure 1 is a plan view, with parts in section, showing the use of a battery of tables and associated parts.

The several tables, for instance six as shown in Figure 1 of the accompanying drawing, are arranged side by side.

One of the trucks carries the smoothing disc 2, the second the disc 4 for working with fine sands, the third the disc 6 for working with emery powders and finally the fourth one or more discs 8 for polishing. All these discs rotate, and are driven by an electric motor.

1, 3, 5 and 7 are the tables either for rough cementing or for turning over.

As the operation of polishing with sand of one degree of fineness requires much less time than the operation of smoothing (rough polishing), the disc for fine sands has sufficient time to perform all the operations required by the sands of various degrees of fineness during the time that the smoothing disc is doing its work on the next table.

The same applies to the work with emery powders, for which only one disc will be used.

It will be seen at once that the attendant who works with new sand, will always work on his apparatus with that sort of sand only; that the attendant who works with fine sands, and he who works with emery powders, as well as the attendant doing the polishing, will always have to work with the same material and always to perform the same operations.

Owing to the provision of two double carriages 9 arranged at opposite ends of the battery of tables, any truck can be easily and quickly moved to any one of the adjoining tables to be brought into operation.

A table receives the rough glass, and as soon as this glass is finished on one face, it is turned over on to the adjoining table. The polished glass store is marked 10 and the rough glass store 11.

To reduce the number of glass tables, and also to reduce the space required for the installation of the smoothing-polishing apparatus, each of the discs for the operations of smoothing, fine said working, emery working and polishing, can be replaced by a set of several rotating discs controlled by an electric motor.

Figure 2:
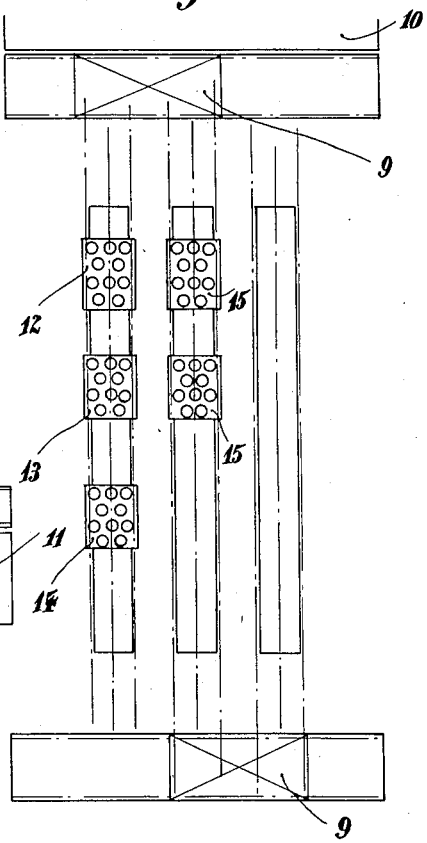
Fig. 2 is a view generally similar to Fig. 1, but showing a set of surface-treating discs, instead of a single disc, associated with the tables.

This construction is shown in Figure 2 and has the advantage that the working with fine sands as well as that with emery powders can be done in one operation, that is to say by a single passage over the glass, one or more sets of discs being used for sand of the same degree of fineness, and the advance or feed being suitably regulated to follow the smoothing.

In the said figure, 12 is the smoothing device, 13 is the fine sand device, 14 the emery device, 15 the polishing device. 9 are the carriages, and 10 the polished glass store.

The polishing device can be arranged in the same way except that the grinding discs can be replaced by discs faced with felt.

Figure 3:
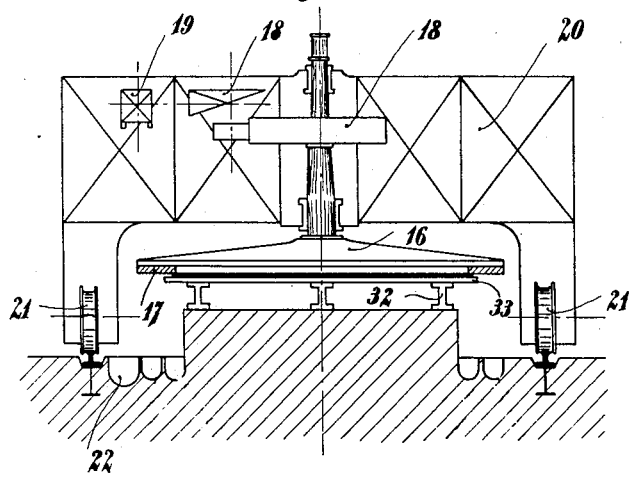
Fig. 3 is an enlarged view of one of the single-disc trucks represented in Fig. 1.

In Figure 3, longitudinal members 32 receive the table 33 to which the glass is cemented either with plaster or by any other means.

This fixed table construction is also very suitable for cementing or securing glass by means of suction valves and suction piping (not shown in the drawing). Moreover, as it is known that it is an advantage to heat the tables during the operation of polishing, this construction can be very easily arranged for internal heating of the table top either by hot water, steam, hot air or by other means. These arrangements are not shown in the drawing.

16 is the disc provided with grinding devices 17 intended to abrade the glass; 18 is a driving gear which can be of any desired kind and which is operated by an electric motor 19. This disc can be raised and lowered, and its pressure on the glass is regulated in any desired known manner. 20 is a truck mounted on wheels 21 and operated by gearing driven by an electric motor.

This gearing has several speeds suitable for each of the operations for which they are intended, for example, treatment with new sand, fine sands, emery powders or putty powder.

A conduit 22, which is always filled with water, is used for feeding the pump arranged on each apparatus (not shown in the drawing). This water is used for carrying away any sand which may fall into it from the table, and also for the various washings.

Each of the trucks 20 carries moreover a tank (not shown in the drawing) intended to receive and to transport the sands and emery powders, etc.

Figure 4:
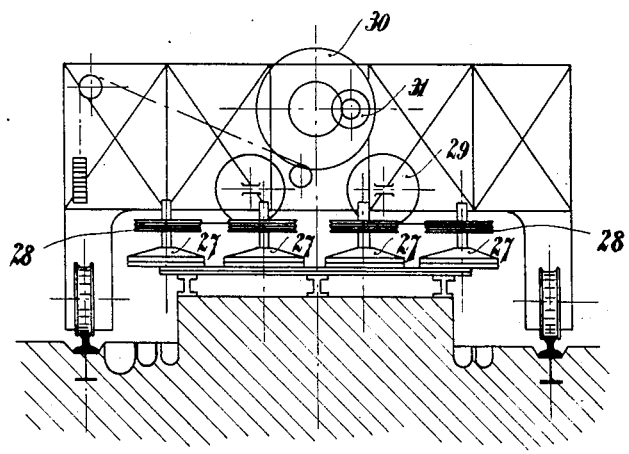
Fig. 4 is a similar view of one of the multiple-disc trucks of Fig. 2.

In Figure 4 the table, the truck and the rails are arranged somewhat in the same manner as in Figure 3. The single disc of Figure 3 is replaced by any desired number of discs 27 supported by spindles to which are keyed two-groove pulleys 28. Two guide pulleys 29 are mounted on tension devices regulating the tension of the cable. A driving pulley 30 is driven by a speed reducing gear and a motor 31.

Figure 5:
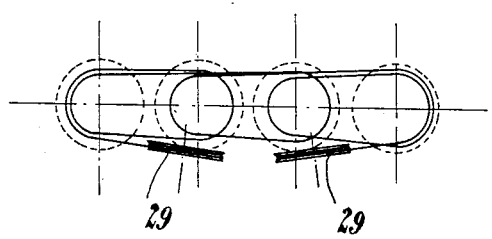
Fig. 5 is a detail of the disc-driving arrangement represented in Fig. 4.

Figure 5 shows in plan the winding of the driving cable which can be of steel, hemp, cotton or other material. This cable drive can be replaced by any desired mechanical driving gear such as gear-wheels, worm drives etc.

A set of discs can also be mounted on an oscillating frame having a reciprocating motion or a circular motion as in the polishing apparatus with rocking lever. Each of the discs can be regulated separately in the vertical direction, and they can also be operated all together.

The discs in Figure 3 or Figure 4 can be fitted with cast iron bars as in existing smoothing apparatus, or with grinding discs or bars of carborundum, stone or any other suitable abrasive material.

I claim:—

Smoothing and polishing apparatus, comprising a battery of stationary tables of great length, whereon the material undergoing treatment is adapted to be secured, fixed side by side in spaced, parallel relation; parallel tracks extending along the opposite ends of the tables at right angles to the latter; carriages adapted to travel along said tracks; and abrading devices adapted to travel longitudinally over said tables for polishing the material secured thereon from end to end thereof, and adapted to be moved from the end of one table to that of the next by means of the carriages.

In testimony whereof I have signed my name to this specification.

PAUL JOSEPH MAXIMILIEN ESCOLE.